INVENTOR.
ROGER D. RING
BY
Warren H. F. Schmieding
ATTORNEY

United States Patent Office 3,477,692
Patented Nov. 11, 1969

3,477,692
SPOOL VALVE
Roger D. Ring, 1305 I Ave., National City, Calif. 92050
Original application Apr. 18, 1966, Ser. No. 543,127.
Divided and this application Oct. 25, 1968, Ser.
No. 770,479
Int. Cl. F16k 5/02, 15/08
U.S. Cl. 251—205                    2 Claims

ABSTRACT OF THE DISCLOSURE

A spool valve including two bodies having axially aligned and equal diameter, inner cylindrical surfaces with a ring interposed between the bodies, the inner diameter of the ring being larger than that of the bodies. The end faces of the bodies confronting the ring are disposed at an angle offset slightly from a line at right angles to the axis of the cylindrical surfaces of the bodies.

CROSS-REFERENCES TO RELATED APPLICATIONS

The present application is a division of my copending application entitled Pattern Tracing Instrument, Ser. No. 543,127, filed Apr. 18, 1966.

BACKGROUND OF THE INVENTION

Field of the invention

The invention is directed to a spool valve and particularly to the type in which the valve is gradually opened and gradually closed to prevent abrupt flow and abrupt cessation of flow of fluid being controlled.

Description of the prior art

The prior art, known to applicant, is a spool valve patent to Rosebrook No. 2,958,340, issued Nov. 1, 1960. In that disclosure, one end surface of the spool is disposed at an angle offset from a line at right angles to the axis of the cylinder. Special machinery is necessary for grinding the end face of the spool.

SUMMARY OF THE INVENTION

The arrangement of the two interiorly cylindrical bodies and the ring which form the cylinder of a spool valve is such that the axial movement of the spool insures a gradual opening and a gradual closing of the valve to thereby prevent abrupt flow and abrupt cessation of flow of fluid being controlled by the valve.

Other features and the advantages of the present invention will be apparent from the following description, reference being had to the accompanying drawing wherein a preferred embodiment of the invention is illustrated.

Description of the preferred embodiment

Figure 1:
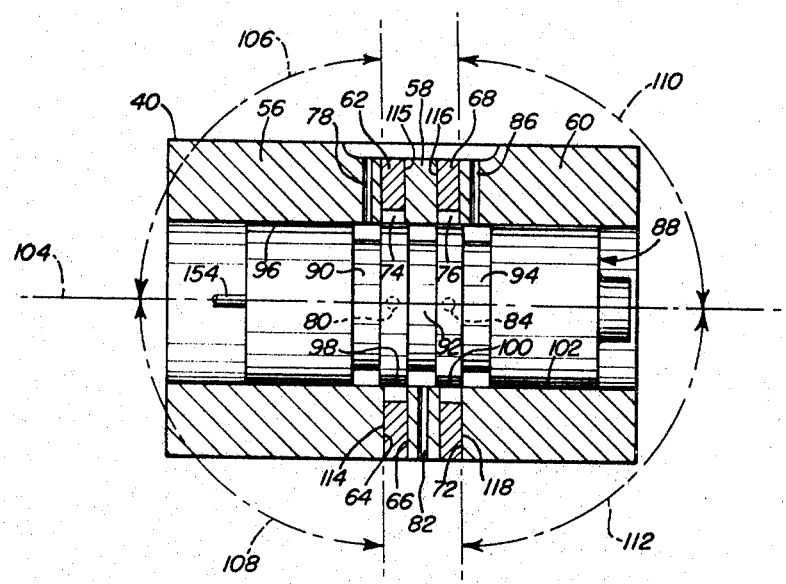
FIG. 1 is a view of a spool valve, the cylinder being shown in section and the spool being shown in elevation and in closed valve position.

Referring more in detail to the drawing, the valve 30 comprises a cylinder 40 formed of at least two bodies and at least one ring interposed between these bodies. In the present embodiment, each of the cylinders is provided with three bodies, herein shown at 56, 58 and 60. The circular openings in the rings 62 and 68 are of larger diameter than the bore in the bodies 56, 58 and 60 to provide fluid areas 74 and 76, respectively. The body 56 is provided with a port 78. The ring 62 is provided with a port 80 and the body 58 is provided with a port 82. The ring 68 is provided with a port 84 and the body 60 is provided with a port 86. Preferably, the bodies 56, 58 and 60 and the rings 62 and 68 are pressed in position in the respective sections 28, 30 and 34 as disclosed in the aforementioned application Ser. No. 543,127.

Each of these cylinders 40, 46 and 48, receives a spool type valve 88 having angular grooves 90, 92 and 94. Lands are formed on the periphery of the spool and are closely embraced by the cylinder provided by the bodies 56, 58 and 60. Land 96 is disposed on one side of the groove 90; a land 98 is disposed between grooves 90 and 92; a land 100 is disposed between grooves 92 and 94 and as is shown in FIG. 4; a land 102 is disposed on the opposite side of groove 94.

The spool is adapted to be reciprocated axially in the cylinder formed by the bodies 56, 58 and 60. When the spool valve 88 is in its intermediate position, as shown in FIG. 1, groove 90 registers with port 78; land 98 covers the area 74 of the ring 62; groove 92 registers with port 82; land 100 covers the area 76 of the ring 68; and groove 94 registers with the port 86 and the body 60. Thus, there can be no flow between port 78 and port 80 because the land 98 blocks the area 74 and the ring 62. Nor can there be any flow of fluid between the port 80 and the port 82 because the land 98 blocks the area 74 in ring 62. Nor can there be any flow of fluid between port 82 and port 84 because the land 100 blocks the flow of fluid to the area 76 and the ring 68. Nor can there be any flow of fluid between the port 84 and port 86 because the land 100 blocks the flow of fluid through the area 76 in ring 68. The land 96 seals with the cylinder portion 56 and the land 102 seals the cylinder portion 60 so as to prevent the flow of fluid through the ends of the cylinder.

When the spool 88 is moved to its extreme right position, registration is maintained between the groove 90 and the port 78; registration is maintained between the groove 92 and the port 82; intercommunication is established between groove 90 and the area 74 surrounded by ring 62 so as to establish intercommunication between port 78 and port 80. Intercommunication is established between port 82 and the area 76 surrounded by ring 68, whereby intercommunication is established between port 82 and port 84. When the spool 88 is moved to its extreme left position, intercommunication is established between port 80 and port 82 through the area 74 surrounded by the ring 62 and the groove 92; and intercommunication is established between port 84 and port 86 through the area 76 surrounded by the ring 68 and the groove 94.

Figure 2:
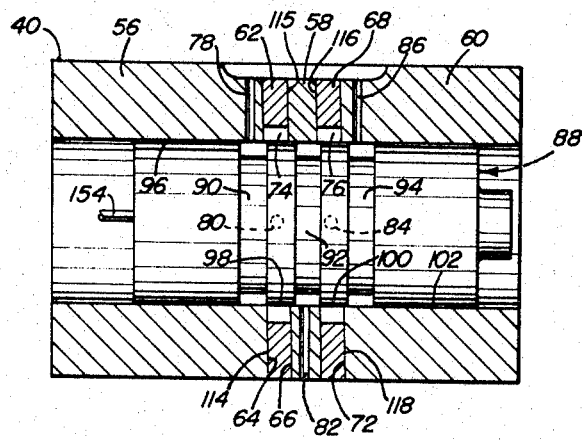
FIG. 2 is a view similar to FIG. 1, but showing the spool in a position in which the valve is in a slightly open position.

It will be observed from FIGS. 1 and 2 that the end faces 64 and 72 of bodies 56 and 60 are not perpendicular with respect to the axis 104 of the cylinders, said axis being shown by dot and dash lines 104. It will be observed from the dot and dash line 106 that the upper half of body 56 is disposed at an acute angle with respect to the axis 104; and it will also be observed by the dot and dash lines 108 that the lower half of the end face 64 of body 56 is at an obtuse angle with respect to the axis. It will also be observed, by the dot and dash line 110, that the upper half of the end face 72 of body 60 is at an obtuse angle with respect to the axis 104 and the lower half of said surface 72, as indicated by dot and dash lines 112, is at an acute angle with respect to said axis. Thus, it will be seen that the lower half of the body 56 is offset longitudinally to the right with respect to the upper half of the surface 64 and that the lower half of said surface 72 of body 60 is offset laterally to the right with respect to the upper half of said surface 72.

This offsetting is exaggerated in the drawing for the purpose of illustration only. In actual practice, in a valve having a one inch diameter spool, the offsetting is approximately .001 of an inch. It will be observed from FIG. 2 that upon slight movement of the spool from the position shown in FIG. 1 to that shown in FIG 2, the upper part of the groove 90 registers with the area 74 while the lower part of the groove does not register with the lower part of the area 74 of the ring 62. The purpose of this offset is to eliminate the abrupt flow of fluid when a 360° angular groove is uncovered. The .001 inch angle permits a gradual opening to provide lower flow rate upon opening movement of the spool. Likewise the flow rate is decreased just prior to the full closing movement of the spool.

It will be understood that the end faces 114 and 115 of the ring 62 are parallel and lie in confronting relationship, respectively, with the end faces 64 and 66 of the bodies 56 and 58, and, the end faces 116 and 118 of the ring 68 are parallel and lie parallelly with the confronting end faces of the bodies 58 and 60, respectively. It will also be understood that this innercircular surface of the body 58 is aligned with and is of the same diameter as the innercircular surface of the body 56 and the body 60. The inner surfaces of the bodies are finished after they are assembled.

It is apparent that the offset surfaces function to prevent the abrupt flow from the area 74 and area 76 to the respective grooves as well as prevent the abrupt flow of fluid from the grooves to the areas 74 and 76.

The valve 88 is reciprocated by a rod 154.

Having described my invention, I claim:
1. A spool valve comprising in combination:
    (A) means forming a cylinder including:
        (1) a body having an end face and a cylindrical inner surface,
        (2) a second body having an end face and a cylindrical inner surface aligned with and conforming in diameter with the cylindrical inner surface of the first mentioned body,
        (3) a ring having end faces on opposite sides thereof, said ring being interposed between the bodies with the end faces thereof in confronting relationship with the said end faces of the bodies, a portion of each of the end faces of the bodies which confront the end faces of the ring being disposed at an acute angle with respect to the axis of the bodies and the remaining portion of each end face of the bodies being at an obtuse angle with respect to said axis, said ring having an inner surface spaced radially outwardly at a greater distance from said axis than the inner surfaces of the bodies,
        (4) means for clamping said ring between the said bodies;
    (B) a cylindrically shaped valve having a diameter so as to be closely embraced by the bodies, and having:
        (1) a groove in the periphery thereof;
    (C) and means for moving the cylindrically shaped valve to and from registering positions of the groove therein and the area within the ring.
2. A spool valve as defined in claim 1, characterized in that the said end faces are flat.

References Cited
UNITED STATES PATENTS

| | | | |
|---|---|---|---|
| 2,958,340 | 11/1960 | Rosebrook | 137—625.69 |
| 3,203,439 | 8/1965 | Beckett | 137—625.69 XR |
| 3,243,025 | 3/1966 | Staab et al. | 137—625.69 XR |
| 3,312,246 | 4/1967 | Tam | 137—625.69 |

M. CARY NELSON, Primary Examiner

ROBERT J. MILLER, Assistant Examiner

U.S. Cl. X.R.

137—625.69